(12) United States Patent
Palmer et al.

(10) Patent No.: US 9,596,606 B1
(45) Date of Patent: Mar. 14, 2017

(54) APPLICATION PROGRAMMING INTERFACE GATEWAY FOR SPONSORED DATA SERVICES

(71) Applicant: Verizon Patent and Licensing Inc., Arlington, VA (US)

(72) Inventors: Okeno Palmer, Oakland, CA (US); Dahai Ren, Lincoln, MA (US); Hector Saint-Hilaire, Waltham, MA (US); Shuai Wu, Wellesley, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 15/137,119

(22) Filed: Apr. 25, 2016

(51) Int. Cl.

| | |
|---|---|
| H04M 1/66 | (2006.01) |
| H04M 1/68 | (2006.01) |
| H04M 3/16 | (2006.01) |
| H04W 12/08 | (2009.01) |
| H04W 12/06 | (2009.01) |
| H04L 29/06 | (2006.01) |
| H04W 88/16 | (2009.01) |

(52) U.S. Cl.
CPC ......... *H04W 12/08* (2013.01); *H04L 63/0846* (2013.01); *H04W 12/06* (2013.01); *H04W 88/16* (2013.01)

(58) Field of Classification Search
CPC ..... H04W 12/08; H04W 12/06; H04W 88/16; H04L 63/0846
See application file for complete search history.

(56) References Cited

U.S. PATENT DOCUMENTS

| | | | | |
|---|---|---|---|---|
| 8,243,928 | B2 * | 8/2012 | Park | G06F 21/445 380/247 |
| 2005/0088976 | A1 * | 4/2005 | Chafle | H04L 12/5695 370/252 |
| 2014/0270172 | A1 * | 9/2014 | Peirce | H04L 9/0819 380/270 |
| 2015/0245202 | A1 * | 8/2015 | Patil | H04W 12/04 380/279 |
| 2015/0341333 | A1 * | 11/2015 | Feng | H04L 63/08 713/168 |
| 2015/0372875 | A1 * | 12/2015 | Turon | H04W 12/06 370/254 |

* cited by examiner

*Primary Examiner* — Ajit Patel (57) ABSTRACT

A method to facilitate secure access to a sponsored data service (SDS) through an application programming interface gateway includes providing an access token to a content provider device, where the access token authorizes the content provider device to receive sponsored data services (SDSs). The method also includes receiving a first request for an SDS resource from the content provider device; generating a first timestamp associated with the first request; determining a destination for the first request, where the destination specifies a network address corresponding to an SDS resource device; forwarding the first request to the SDS resource device based on the determined destination; receiving a first response from the SDS resource device corresponding to the first request; generating a second timestamp associated with the first response; and forwarding the first response, along with the first timestamp and the second timestamp, to the content provider device.

20 Claims, 8 Drawing Sheets

APPLICATION PROGRAMMING INTERFACE GATEWAY FOR SPONSORED DATA SERVICES

BACKGROUND

User access to wireless communication networks and data services typically involves some form of payment made to the network provider. In some instances, a third party may wish to sponsor a user's data consumption in order to entice user engagement. A user's access to sponsored data may involve data exchanges between content providers and a variety of infrastructure devices in order to provide secure access to content and accurate billing to the sponsor for data consumed by the user.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to an application programming interface (API) gateway which may facilitate secure access by a content provider to a sponsored data service (SDS). An SDS (which is also referred to herein as a "toll free data service") may include a network service that is financially supported by a third party entity. The third party entity, hereinafter referred to as a "sponsor," subsidizes the network data exchanged between a user device and a specified content provider. The sponsor may have a relationship with the network provider that permits the automatic billing of the sponsor for the exchanged data, instead of the user of a user device. Thus, the data exchanged through the SDS (which may also be referred to herein as "sponsored data" or "sponsored content") is effectively "toll-free" as seen by the user of the user device. The sponsored data may be downloaded to the user device from the specified content provider. Sponsored content may include, for example, content represented as alphanumeric text, graphics, images, audio, and/or video data.

In modern network configurations, sponsored content may be provided from a number of different content providers interconnected by one or more networks. In some instances, one or more content providers, in addition to hosting their own content, may act as content aggregators or "middlemen," and provide access to additional content hosted by other "downstream" content providers. In order to maintain network security and proper billing and data accounting integrity, secure methods may be used to provide sponsored data among the various content providers using architectures which may include an API gateway device. The API gateway device, in conjunction with modules and APIs residing within the content providers (hereinafter referred to as "service side plugins"), may manage interactions between the content providers and network infrastructure devices supporting SDS resources. Thus, the API gateway device 170 may act as a "reverse proxy" for the content providers in accessing SDS resources. As will be explained in more detail below, such secure methods can include the use of time stamps and credentials for authentication and validation of billing and/or data accounting. Thus, embodiments presented herein reduce the burden of content partners interacting with a variety of infrastructure devices to support sponsored data services.

Figure 1:
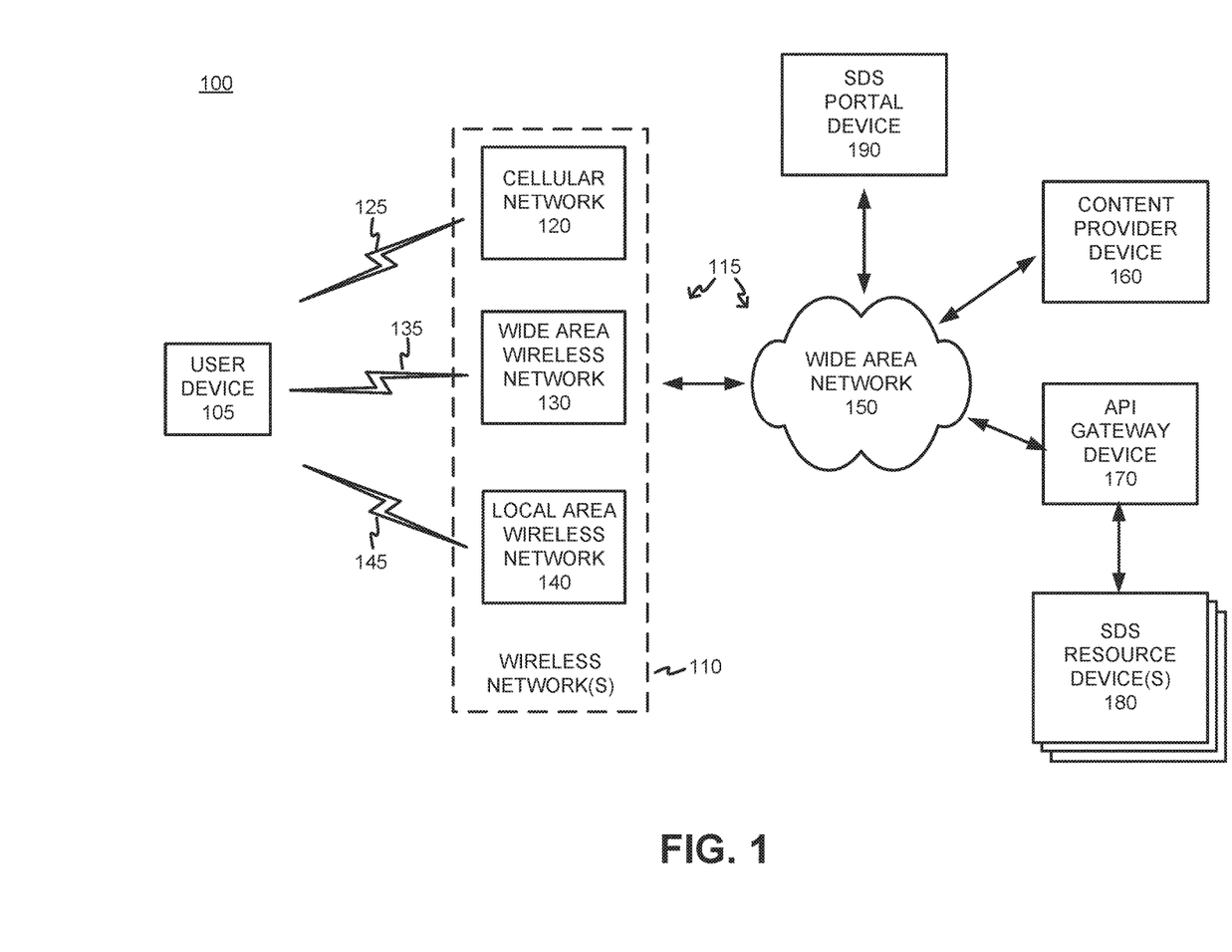
FIG. 1 is a block diagram of an exemplary network environment for facilitating access to sponsored data services (SDSs) using an application programming interface (API) gateway device.

FIG. 1 is a block diagram of an exemplary network environment 100 for facilitating access to sponsored data services (SDSs) through an application programming interface (API) gateway device. Environment 100 may include one or more user devices 105, network 115, a content provider device 160, an API gateway device 170, one or more SDS resource device(s) 180, and an SDS portal device 190. Network 115 may include one or more wireless network(s) 110 and a wide area network 150. Wireless networks 110 may further include, for example, a cellular network 120, a wide area wireless network 130, and/or a local area wireless network 140. For ease of explanation, only one user device 105, content provider device 160, API gateway device 170, and SDS portal device 190 are illustrated as being connected to network 115. However, it should be understood that a plurality of user devices 105, content provider devices 160, API gateway devices 170, SDS portal devices 190, and/or other known network entities may be communicatively coupled to network 115. FIG. 1 depicts a representative environment 100 with exemplary components and configuration shown for purposes of explanation. Other embodiments may include additional or different network entities in alternative configurations than which are exemplified in FIG. 1.

User device 105 may obtain access to network 115 through wireless network(s) 110 over any type of known radio channel or combinations thereof. For example, user device 105 may access cellular network 120 over wireless channel 125. Access over wireless channel 125 may be provided through a base station, eNodeB, etc., within cellular network 120, as will be described in more detail below in reference to an embodiment shown in FIG. 2. In various embodiments, cellular network 120, wide area wireless network 130, and/or local area wireless network 140 may also communicate with each other in addition to user device 105. User device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. User device 105 may access network 115 over wireless channel 145 through local area wireless network 140, which may include WiFi (e.g., any IEEE 801.11x network, where x=a, b, g, n, and/or ac). The wireless network(s) 110 may exchange data with wide area network 150 that may include backhaul networks, backbone networks, and/or core networks. Content provider device 160, API gateway device 170, and SDS portal device 190 may interface with wide area network 150, and thus with user device 105 over one or more of the air interfaces 125, 135, 145 through wireless network(s) 110. In the embodiment shown in FIG. 1, SDS resource device(s) 180 may communicate with API gateway device 170 over, for example, a back-end private network (not shown) which may be controlled by a network provider. However, in other embodiments, additionally, or alternatively, SDS resource device(s) may also communicate with API gateway device 170 through wide area network 150.

User device 105 may obtain SDS access to network 115 over one or more air interfaces 125, 135, and/or 145, which may be supported by the sponsor to provide content to user device 105 through content provider device 160. As used herein, content may also be referred to herein as "media," and may include any type of digital data representing user-interpretable information, including text, image, audio, and/or video data. Media may also include one or more combinations of any type of digital data that may be arranged, composited, and presented to the user, such as, for example, in the form of web pages described using hypertext markup language (HTML). Connections for sponsored data exchanges may be established by sponsors who arrange access for particular events and/or promotions (which may be referred to herein as "campaigns"). The campaigns may be arranged through SDS portal device 190 assigned by the network provider (e.g., a web portal under control of the network provider). In an embodiment, the sponsor may access SDS portal device 190 through content provider device 160. Additionally, or alternatively, the sponsor may also access SDS portal device 190 through another independent network device (not shown). When setting up a particular content provider device 160 to provide sponsored content for a campaign, the SDS portal 190 may be used to obtain software and/or data files (e.g., a server side plugin) to facilitate communications through API gateway device 170 for accessing various SDS resource device(s) 180. Additionally, SDS portal device 190 may provide credentials for the content provider which allow access to SDS resource devices 180.

When arranging a campaign, the sponsor may set various parameters for the campaign (such as, for example, media specification, time duration, maximum number of users, maximum allotment of data, etc.). The sponsor may also provide campaign network addresses identifying content providers and customer identifiers indicating the identity of a content provider. Accordingly, campaign network addresses and customer identifiers may be entered for content provider device 160. The campaign network addresses may be used in generating SDS network addresses which are used by the user device 105 to request sponsored content from content provider device 160. For example, a campaign network address may be a URL linking to content provider device 160 that user device 105 may use to access sponsored content.

In order to validate transactions with the infrastructure of the SDS and/or ensure that sponsors are properly billed for content, API gateway device 170 provides an interface between a network provider's back-end infrastructure and content provider device 160. Accordingly, content provider device 160 may exchange data with SDS resource device(s) 180 through API gateway device 170, as, for example, a single point of contact. Thus, API gateway device 170 may accept requests from content provider 160 for various back-end SDS services, and then route the requests to the appropriate SDS resource device(s) 180 depending upon the request. Additionally, API gateway device 170 may receive responses from the requests, and route the responses back to the requesting content provider device 160. Moreover, to facilitate security, sponsor billing, and/or data consumption tracking, API gateway device 170 may further generate timestamps corresponding to received requests from content provider device 160 and/or responses from SDS resource device(s) 180, and bundle timestamps when forwarding the requests to SDS resource devices 180 and/or the responses to content provider device 160.

Further referring to FIG. 1, user device 105 may include any type of electronic device having communication capabilities, and thus communicate over network 115 using a variety of different channels, including both wired and wireless connections. User device 105 may include, for example, a cellular radiotelephone, a smart phone, a wearable computer (e.g., a wrist watch, eye glasses, etc.), a tablet, a set-top box (STB), a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms). User device 105 may use applications or websites to download sponsored content by making network requests using the signed SDS network addresses. Requests for sponsored content may be intercepted by network devices in back-end infrastructure (not shown) which are responsible for tracking downloaded toll free data and billing sponsors campaign for cost of data used.

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Content provider device 160 may be any type of network device (e.g., a web server, computer, media repository, streaming source, etc.) that may provide access to sponsored content via signed SDS network addresses. The signed SDS network address may link to sponsored content which is hosted locally on content provider device 160, or remotely on one or more content partner devices (not shown). Content provider device 160 may be owned by the sponsor or act as agent of the sponsor, serving as a "middle man" to provide access for sponsored content to user device 105 from any content provider identified by signed SDS network identifiers. Content provider device 160 may host and/or provide links to any type of media, such as, for example, text, audio, image, video, software code, etc.

API gateway device 170 may be any type of network device (e.g., a server, computer, etc.), or servlet running within a web server, that may respond to requests from content provider device 160 for SDS resources, and provide responses from SDS resource device(s) 180 back to content provider device 160. API gateway device 170 may act as a reverse proxy by redirecting relevant requests to appropriate SDS resource device(s) 180 by determining network destinations based on requests from content provider devices 160, and determine network destinations of content provider devices 160 based on responses from SDS resource device(s) 180. In addition to serving as a reverse proxy, API gateway device 170 may generate timestamps associated with received requests and responses, and attach the generated timestamps when forwarding the requests and response to the appropriate network device. The timestamps appended to the request/response pairs associated with content provider device 160 are used in the determination of billing for the sponsored content used in the SDS sessions.

SDS resource device(s) 180 may be any type of network device, such as, for example, a server, computer, a servlet, etc., which may reside in the back-end infrastructure of sponsored data service, and may be controlled in whole, or in part, by a network provider. SDS resource devices 180 may provide various resources in response to requests from content provider devices 160 received through API gateway device 170. Examples of SDS resource device(s) 180 may include authentication devices for validating SDS requests, content provider devices 160 and/or their associated sponsors, user devices 105 and/or client end users. SDS resource device(s) 180 may also include various managers and/or collection devices to facilitate sponsor billing and data usage tracking. For example, SDS resource device(s) 180 may include a session timing record manager (STRM) which may collect and manage time stamps received from the API gateway device.

SDS portal device 190 may be any type of network device, such as, for example, a server, computer, etc., that receives information from sponsors and/or their agents to generate and modify a campaign for sponsored data. In embodiments provided herein, the sponsor may designate content provider device 160 (either under the direct control of the sponsor, or as a designated agent) to create the campaign by logging into SDS portal device 190 to supply campaign network addresses (e.g., campaign URLs) for content providers and customer identifiers (e.g., customer identification numbers) associated with the campaign network addresses. SDS portal device 190 may provide content provider devices 160 credentials (such as client identifiers (IDs) and/or client secrets), software APIs (e.g., service side plugins described below in relation to FIG. 3), and/or data to facilitate exchanges with the SDS resource device(s) 180 through API gateway device 170. Content provider devices 160 may also log into SDS portal device 190 to obtain APIs and/or security credentials used for signing SDS network addresses to validate requests from user device 105.

Figure 2:
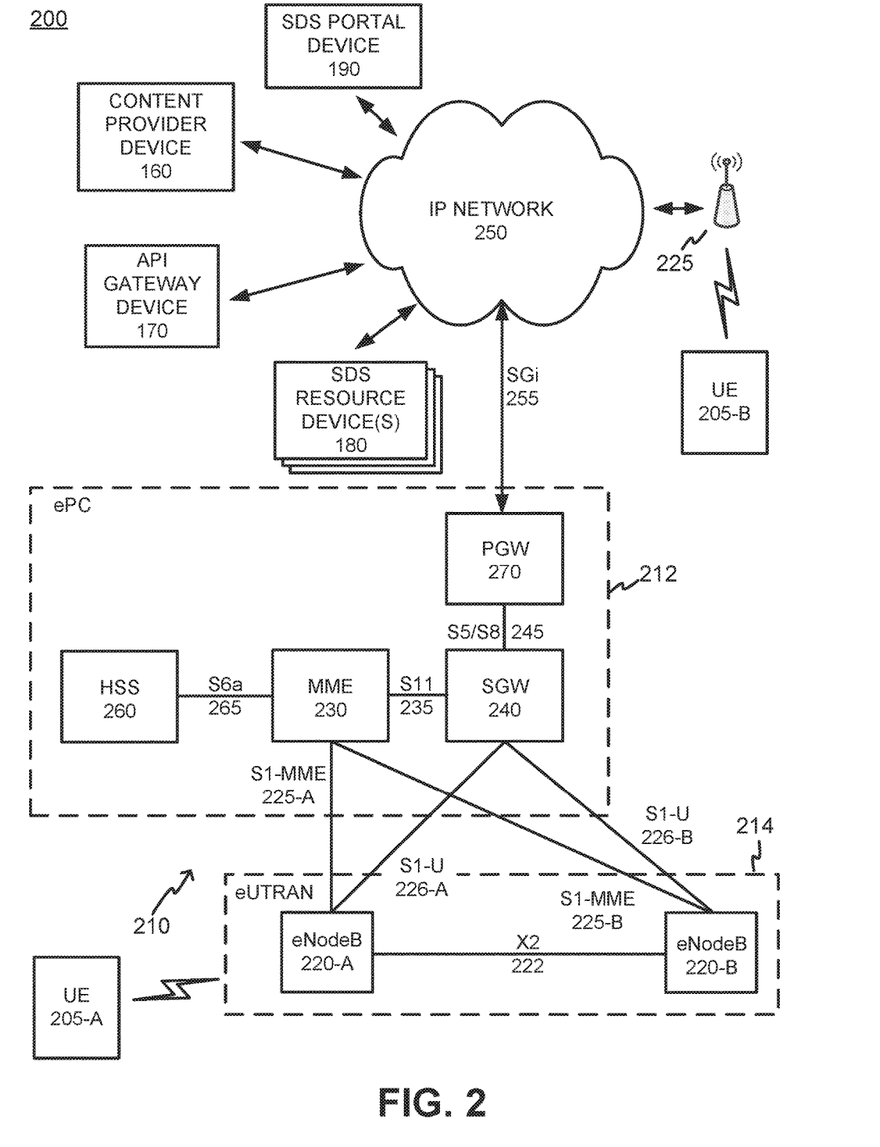
FIG. 2 is a block diagram of an exemplary networking system that provides sponsored data over various types of wireless channels.

FIG. 2 is a block diagram of an exemplary networking system 200 that provides sponsored data over various types of wireless channels. As shown in FIG. 2, networking system 200 may include user device 105 embodied as user equipment (UE) 205-A and UE 205-B (as used herein, collectively referred to as "UE 205" and individually as "UE 205-*x*"), a wireless network 210 which includes an evolved Packet Core (ePC) 212 and an evolved UMTS Terrestrial Network (eUTRAN) 214, an Internet Protocol (IP) network 250, a WiFi wireless access point (WAP) 225, content provider device 160, API gateway device 170, SDS resource device(s) 180, and SDS portal device 190.

Wireless network 210 may be a long term evolution (LTE) network, and include one or more devices that are physical and/or logical entities interconnected via standardized interfaces. Wireless network 210 provides wireless packet-switched services and wireless IP connectivity to user devices to provide, for example, data, voice, and/or multimedia services. The ePC 212 may further include a mobility management entity (MME) 230, a serving gateway (SGW) device 240, a packet data network gateway (PGW) 270, and a home subscriber server (HSS) 260. The eUTRAN 214 may further include one or more eNodeBs 220-A and 220-B (herein referred to plurally as "eNodeB 220" and individually as "eNodeB 220-*x*"). It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, each eNodeB 220 may include one or more devices and other components having functionality that allow UE 205 to wirelessly connect to eUTRAN 214. eNodeB 220-A and eNodeB 220-B may each interface with ePC 212 via a S1 interface, which may be split into a control plane S1-MME interface 225-A and a data plane S1-U interface 226. For example, S1-MME interface 225-A may interface with MME device 230. S1-MME interface 225-A may be implemented, for example, with a protocol stack that includes a Network Access Server (NAS) protocol and/or Stream Control Transmission Protocol (SCTP). S1-U interface 226-B may interface with SGW 240 and may be implemented, for example, using a General Packet Radio Service Tunneling Protocol version 2 (GTPv2). ENodeB 220-A may communicate with eNodeB 220-B via an X2 interface 222. X2 interface 222 may be implemented, for example, with a protocol stack that includes an X2 application protocol and SCTP.

MME device 230 may implement control plane processing for ePC 212. For example, MME device 230 may implement tracking and paging procedures for UE 205, may activate and deactivate bearers for UE 205, may authenticate a user of UE 205, and may interface to non-LTE radio access networks. A bearer may represent a logical channel with particular quality of service (QoS) requirements. MME device 230 may also select a particular SGW 240 for a particular UE 205. A particular MME device 230 may interface with other MME devices 230 in ePC 212 and may send and receive information associated with UEs, which may allow one MME device to take over control plane processing of UEs serviced by another MME device, if the other MME device becomes unavailable.

SGW 240 may provide an access point to and from UE 205, may handle forwarding of data packets for UE 205-A, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250 may include, for example, an IP Multimedia Subsystem (IMS) network, which may provide voice and multimedia services to UE 205, based on Session Initiation Protocol (SIP). A particular UE 205, while connected to a single SGW 240, may be connected to multiple PGWs 270, one for each packet network with which UE 205 communicates.

Alternatively, UE 205-B may exchange data with IP network 250 though WiFi wireless access point (WAP) 225. The WiFi WAP 225 may be part of a local area network, and access IP network 250 through a wired connection via a router. Alternatively, WiFi WAP 225 may be part of a mesh network (e.g., IEEE 801.11s). WiFi WAP 225 may be part of a local area network, or part of a wide area network (WiMaxx) or a mesh network (IEEE 801.11s).

MME device 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME device 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

HSS device 260 may store information associated with UEs 205 and/or information associated with users of UEs 205. For example, HSS device 260 may store user profiles that include authentication and access authorization information. MME device 230 may communicate with HSS device 260 through an S6a interface 265. S6a interface 265 may be implemented, for example, using a Diameter protocol.

Content provider device 160 may be any type of web server, media repository, streaming source, etc., that can provide UE 205 with sponsored content which is locally hosted, or provided from another networked content partner device (not shown). Content provider device 160 may exchange information using a standard TCP/IP interface with IP network 250, and further communicate with ePC 212 using SGi 255. Communications between content provider device 160 and UEs 205 may be performed through ePC 212 and eUTRAN 214 as shown for UE 205-A, or through WiFi WAP 225 as shown for UE 205-B. Content provider device 160 may provide any form of media, text, audio, image, video, etc., to requesting UE 205. Moreover, content provider device 160 may provide simultaneous broadcast of data to a plurality of UEs 205 using simulcast and/or multicast techniques, such as, for example, any type of multimedia broadcast multicast service (MBMS) and/or evolved MBMS (eMBMS) over LTE. In one embodiment, UE 205 may provide a request to content provider device 160 over wireless network 210. The request for sponsored data access may be initially received by the eUTRAN 214, and then forwarded through gateways SGW 240 and PGW 270 to content provider device 160. The communications between content provider device 160 and UE 205 may be "channel agnostic," and thus may be performed using any known wireless and/or wired channels, or combinations thereof. Accordingly, other methods for communication between content provider device 160 and UE 205 may be used which are not illustrated in FIG. 2.

API gateway device 170 may be any type of network device, computer, web server, etc. which may act as an intermediary between content provider device 160 and SDS resource device(s) 180. API gateway device 170 may interface to IP network 250 for exchanging data between content provider device 160 and SDS resource device(s) 180.

SDS resource device(s) 180 may be network device, computer, web server, etc. which may provide resources to content provider devices 160 to facilitate sponsored data services. SDS resource device(s) 180 may interface to IP network 250 to exchange data with other network components, for example, with content provider device 160 through API gateway device 170.

SDS portal device 190 may be any type of web server, computer, network device, etc. that may be used to generate and modify a campaign for sponsored data based on information received from sponsor controlled devices, such as, for example, content provider device 160. In embodiments provided herein, the sponsor may create the campaign by logging into SDS portal device 190 to supply campaign network addresses and customer identifiers associated with the campaign network addresses. SDS portal device 190 may exchange information with content provider device 160 using, for example, a standard TCP/IP interface with IP network 250.

While FIG. 2 shows exemplary components of system 200, in other implementations, networking system 200 may include fewer components, different components, differently arranged components, or additional components than depicted in FIG. 2. Additionally, or alternatively, one or more components of networking system 200 may perform functions described as being performed by one or more other components of networking system 200.

Figure 3:
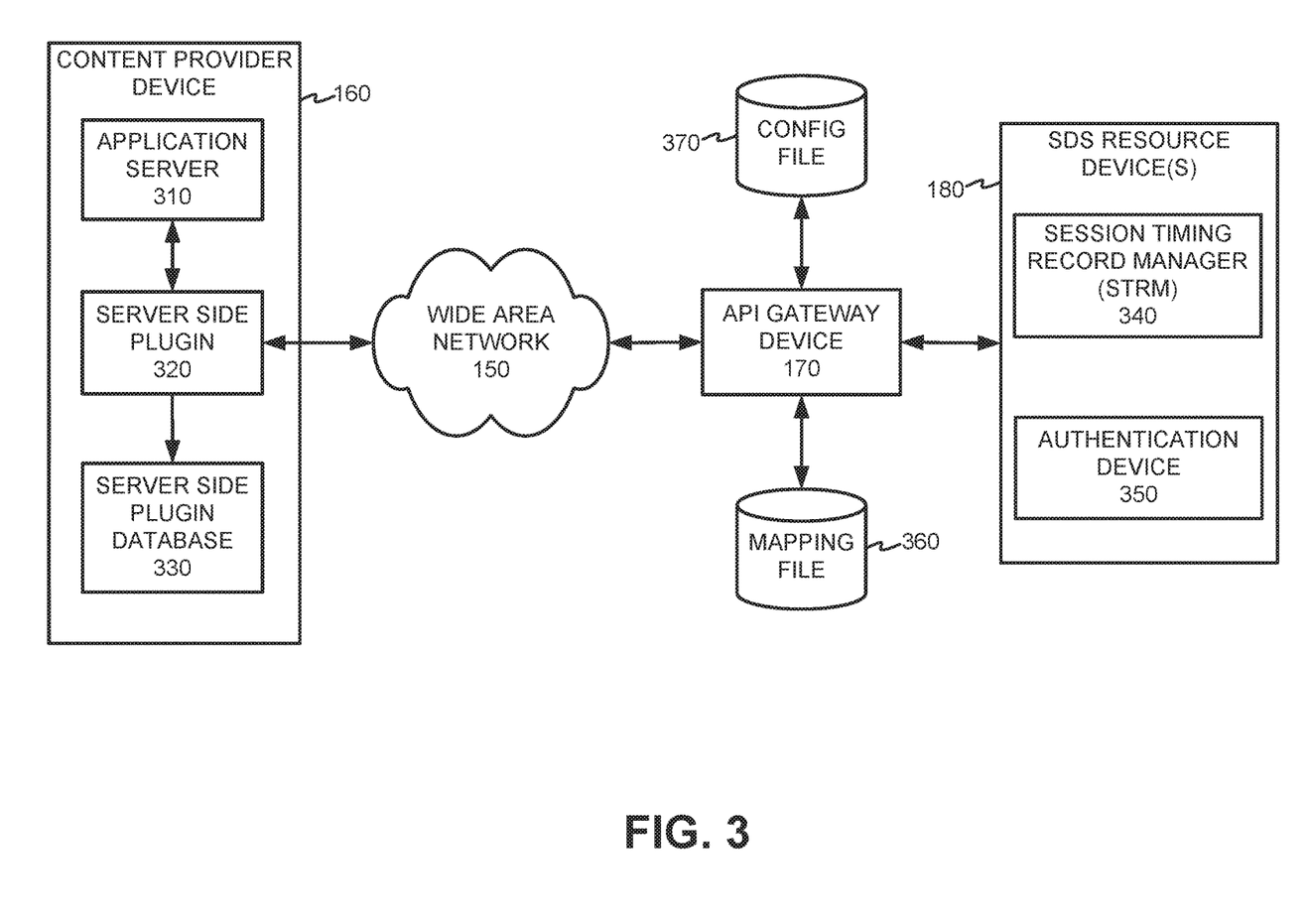
FIG. 3 is a block diagram illustrating details of the content provider device, the API gateway device, and the SDS resource device(s) according to an embodiment.

FIG. 3 is a block diagram illustrating details of content provider device 160, API gateway device 170, and SDS resource device(s) 180 according to an embodiment. Content provider device 160 may include application server 310, server side plugin 320, and service side plugin database 330. API gateway device 170 may include mapping file 360 and configuration file 370. SDS resource device(s) 180 may include session timing record manager (STRM) 340 and authentication device 350.

Content provider device 160 may receive a request for sponsored content (e.g., a request for movie files from a movie site) from end users via user device 105 over network 115. Application server 310 may initially process the sponsored content request which may be received via an SDS network address used by mobile device 105 to access content provider device 160. In an embodiment, the SDS network address and content request may be made in the form of a URL request using hypertext transfer protocol (HTTP). Application server 310 may pass the sponsored content request to server side plugin 320 which detects the SDS network address, and caches selected information received from the SDS network address in server side plugin database 330. The cached information may include, for example, the credentials of the user making the request. Additionally, server side plugin database 330 may also cache timestamps generated by API gateway device 170, as will be described in more detail below in regards to FIG. 5.

In order to authenticate the sponsored content request, and/or to record information for billing and/or data usage (e.g. timestamps), server side plugin 320 may access SDS resource device(s) 180 via wide area network 150 through API gateway device 170. SDS resource device(s) 180 may be embodied in back-end infrastructure devices, and thus may be protected by network security devices (e.g., firewalls). Accordingly, access to SDS resource device(s) 180 by server side plugin 320 is securely managed by API gateway device 170. All requests going through API gateway device 170 may be validated by authentication device 350.

SDS resource device(s) 180 may further include STRM 340 which records and manages timestamps generated by API gateway device 170. The timestamps appended to the request/response pairs involved with server side plugin 320 aide in the proper calculation of Session Timing Records (STR) which may be used for billing information and/or data usages associated with SDS (e.g., HTTP secure) sessions. Described below is a simplified description of the call flow for server side plugin 320 to access services of STRM 340 through API gateway device 170. Detailed descriptions of different call flows are described in relation to FIGS. 5-7.

Initially, server side plugin 320 may send a call to STRM 340 requesting that it record a timestamp generated by API gateway device 170. Server side plugin 320 may send the call via wide area network 150 to API gateway device 170. API gateway device 170 may access authentication device 350 to determine if content provider device 160 is authorized to send this call to STRM 340. Upon being validated by authentication device 350, API gateway device 170 may determine from information embedded in the call that the STRM 340 is the appropriate destination to forward the call, and then may generate a timestamp of when the call was received, and forward the call along with the timestamp to the STRM 340. STRM 340 may process the call and record received timestamp, and provide an acknowledgment back to the API gateway device 170. The API gateway device 170 may generate another timestamp of when the acknowledgment was received, and forward the acknowledgment and the timestamp pair to the server side plugin 320.

Internally, API gateway device 170 may determine a destination to forward traffic based on information received in the request (e.g., in a uniform resource identifier). The destinations for traffic may be defined in configuration file 370. When a request is received, API gateway device 170 may execute a mapping according to mapping file 360 to determine whether the API gateway device 170 will take action on the request or not. The mapping permits the API gateway device 170 to parse information (e.g., characters in the received request) to match string patterns associated with different SDS resource devices 180. If a match is determined and a string pattern is recognized, then API gateway device 170 may obtain a network address of the SDS resource device 180 corresponding to the matched string pattern. In an embodiment, mapping file 360 may be in the form of an extensible markup language (XML) file, and configuration file may be a text-based data that can be manually specified.

Figure 4:
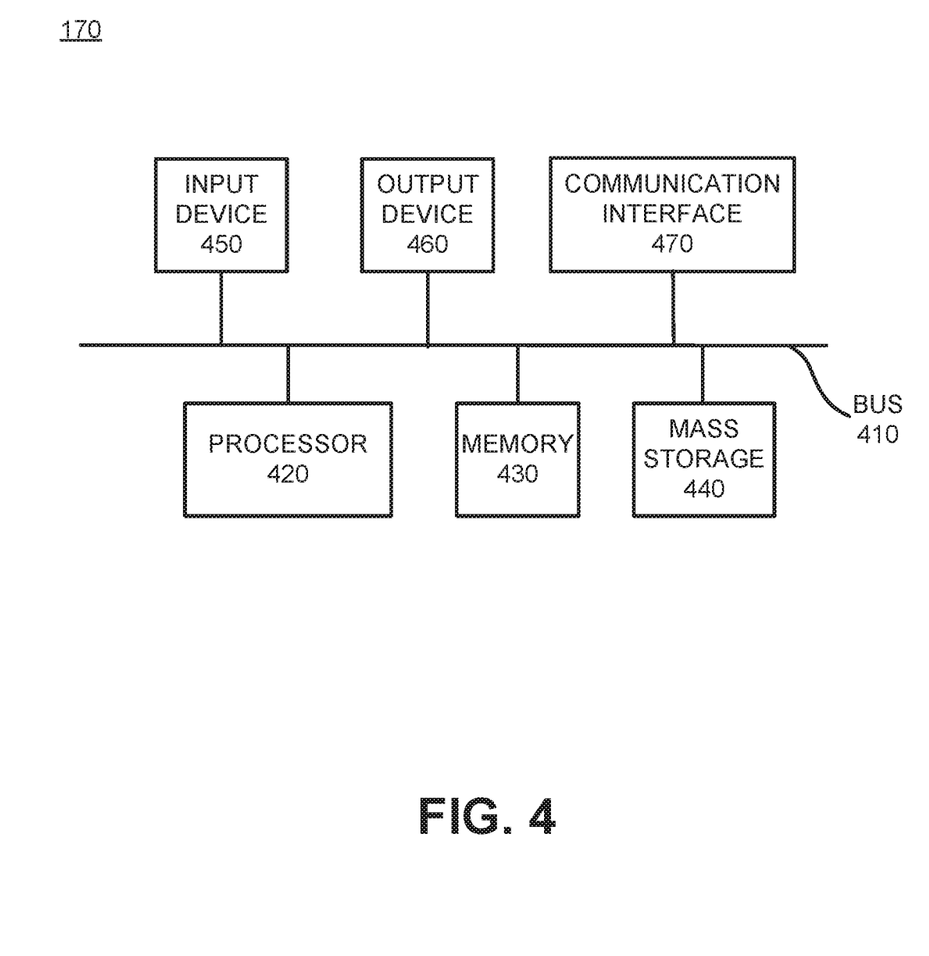
FIG. 4 is a block diagram showing exemplary components of an API gateway device according to an embodiment.

FIG. 4 is a block diagram showing exemplary components of an API gateway device 170 according to an embodiment. API gateway device 170 may include a bus 410, a processor 420, a memory 430, mass storage 440, an input device 450, an output device 460, and a communication interface 470. Other devices in environment 100, such as content provider device 160, SDS resource device(s) 180, and SDS portal device 190 may be configured in a similar manner.

Bus 410 includes a path that permits communication among the components of API gateway device 170. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 150.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Mass storage 440 may include any type of on-board device suitable for storing large amounts of data, and may include one or more hard drives, solid state drives, and/or various types of redundant array of independent disks (RAID) arrays. Mass storage device 440 is suitable for storing data associated with, for example, mapping file 360, configuration file 370, various credentials (for example client identifiers and client secrets), etc.

Input device 450, which may be optional, can allow an operator to input information into API gateway device 170, if required. Input device 450 may include, for example, a keyboard, a mouse, a pen, a microphone, a remote control, an audio capture device, an image and/or video capture device, a touch-screen display, and/or another type of input device. In some embodiments, API gateway device 170 may be managed remotely and may not include input device 450. Output device 460 may output information to an operator of API gateway device 170. Output device 460 may include a display (such as a liquid crystal display (LCD)), a printer, a speaker, and/or another type of output device. In some embodiments, API gateway device 170 may be managed remotely and may not include output device 460.

Communication interface 470 may include a transceiver that enables API gateway device 170 to communicate with other devices and/or systems over a network (e.g., wide area network 150, IP network 250, etc.). Communications interface 470 may be configured to exchange data over wired communications (e.g., conductive wire, twisted pair cable, coaxial cable, transmission line, fiber optic cable, and/or waveguide, etc.), or a combination of wireless. In other embodiments, communication interface 470 may communicate using a wireless communications channel, such as, for example, radio frequency (RF), infrared, and/or visual optics, etc. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, API gateway device 170 may perform certain operations relating to facilitating secure communications between content provider devices 160 and SDS resource device(s) 180. API gateway device 170 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of API gateway device 170, in other implementations, API gateway device 170 may include fewer components, different components, additional components, or differently arranged components than depicted in FIG. 4.

Figure 5:
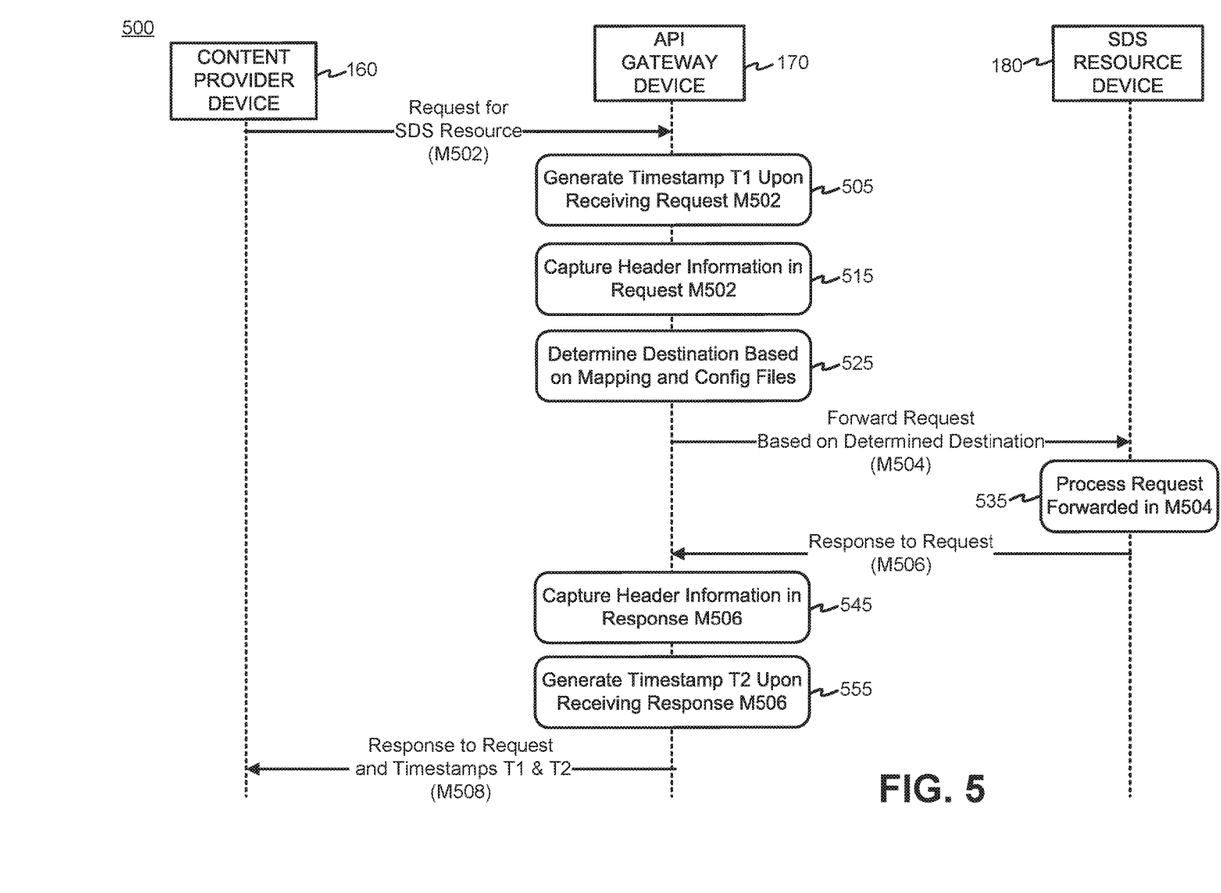
FIG. 5 is a diagram depicting exemplary message flows between selected devices within the network environment shown in FIG. 1.

FIG. 5 is a diagram depicting exemplary message flows 500 between selected devices within the network environment 100 shown in FIG. 1. Specifically, message flows between content provider device 160, API gateway device 170, and a particular SDS resource device 180 are shown.

Initially, content provider device 160 may send a request for a particular SDS resource to API gateway device 170 (M502). API gateway device 170 may generate a timestamp (T1) upon receiving request M502 from content provider device 160 (Block 505). The timestamp may include time and date information, and may be in conformance with the International Organization for Standardization (ISO) 8601 standard. API gateway device 170 may also cache timestamps so they may be provided to content provider device 160 at a later time. API gateway device 170 may then capture header information in request M502 (Block 515), which may include various metadata, including credentials associated with the content provider device 160, destination information, etc. API gateway device 170 may obtain a destination network address for a particular SDS resource device 180 (Block 525) The destination network address (e.g., a URI) may be determined by matching string patterns in the received request M502 using instructions found in mapping file 360 and network addresses corresponding to string patterns specified in configuration file 370.

Once the destination network address is determined, API gateway device 170 may forward the request received from content provider device 160 to the particular SDS resource device 180 (M504). The SDS resource device 180 may process the request (Block 535), and then provide a response to the request back to API gateway device 170 (M506). The API gateway device 170 may capture header information in response M506 (Block 545). API gateway device 170 may then generate a timestamp T2 upon receiving the response M506 (Block 555). Once the timestamp T2 is generated, API gateway device 170 may forward the response to the request, along with both timestamps T1 and T2, to content provider device 160 (M508). Because timestamp T1 can be cached by API gateway device 170 after being generated in Block 505, the timestamps T1 and T2 may be both provided in a single message M508, thus improving efficiency. Server side plugin 320 may store timestamps T1 and T2 and determine a difference between the two timestamps to assist in subsequent billing associated with sponsored content provided by content provider device 160.

Figure 6:
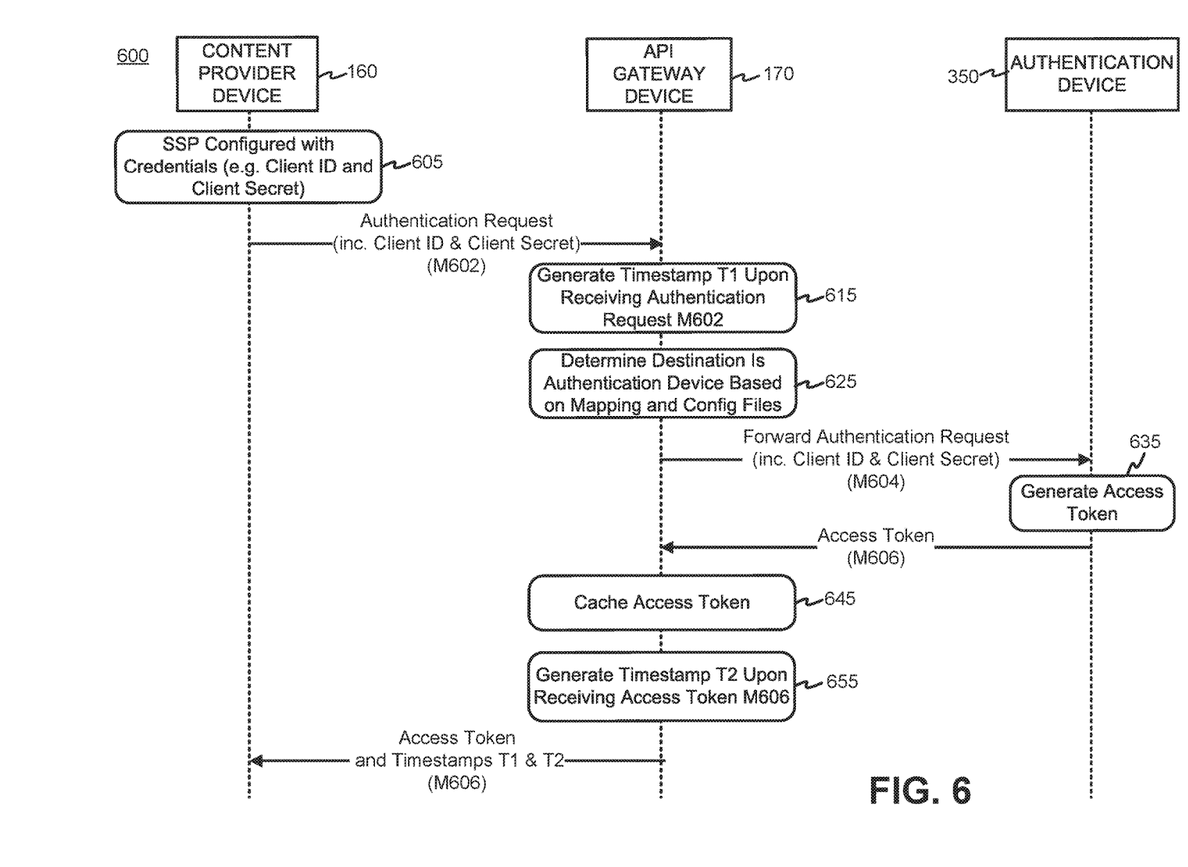
FIG. 6 is a diagram depicting exemplary message flows associated with granting an access token to a content provider device within the network environment shown in FIG. 1.

FIG. 6 is a diagram depicting exemplary message flows 600 associated with granting an access token to content provider device 160 within the network environment 100. Initially, as a precondition, content provider device 160 may configure server side plugin (designated "SSP" in FIG. 6) 320 with credentials which are associated with content provider device 160 for a particular campaign (Block 605). The client credentials may be provided by SDS portal device 190 when the sponsor configures content provider device 160 for the campaign. The client credentials may include, for example a client identifier (ID) and/or a client secret assigned to content provider device 160 for the campaign. Once server side plugin 320 is properly configured, content provider device 160 may send an authentication request to API gateway device 170 (M602). The authentication request M602 may include the credentials (e.g., client ID and/or client secret). API gateway device 170 may generate a timestamp (T1) upon receiving the authentication request M602 (Block 615). API gateway device 170 may then determine that the destination for the authentication request M602 is authentication device 350 (Block 625). API gateway device 170 may determine the destination using mapping file 360 and configuration file 370 in a manner similar to that described above for Block 525 in FIG. 5. API gateway device 170 may forward the authentication request, along with the credentials for the content provider device 160 (e.g., client ID and/or client secret) to authentication device 350 (M604). Authentication device 350 may generate an access token based on the credentials for content provider device 160 (Block 635), and forward the access token back to API Gateway device 170 (M606). For subsequent transactions, the access token may be used for authentication and/or validation of content provider device 160 instead of the client credentials. Additionally, the access token may improve security by expiring after a fixed time duration. In an embodiment, API gateway device 170 may cache the access token to reduce traffic to authentication device 350 (Block 645). API gateway device 655 may generate another timestamp T2 upon receiving the access token (Block 655). API Gateway device 170 may the forward the access token, along with timestamps T1 and T2, to content provider device 160 (M606).

Figure 7:
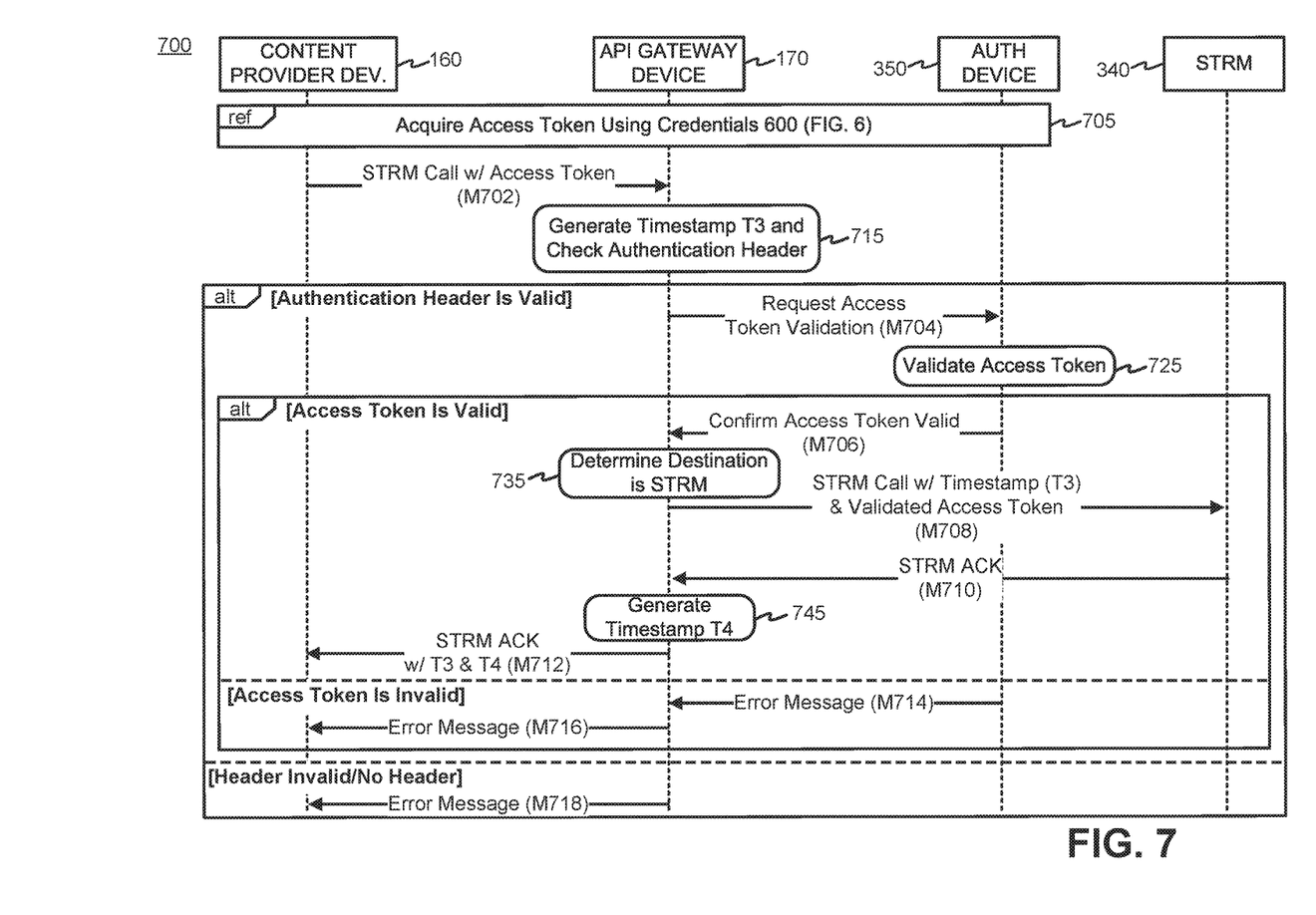
FIG. 7 is a diagram depicting exemplary message flows associated with an authentication device and a session timing record manager (STRM) in the network environment shown in FIG. 1.

FIG. 7 is a diagram depicting exemplary message flows 700 associated with authentication device 350 and STRM 340 in network environment 100. Initially, content provider device 160 may acquire the access token using credentials as described above in relation to FIG. 6 (Block 705, which refers to message flow 600). Content provider device 160 may then send a STRM call, which may include the access token, to API gateway device 170. API gateway device 170 may generate a timestamp T3 upon receiving STRM call M702, and then check an authentication header included in STRM call M702 (Block 715).

If the authentication header is determined to be valid in Block 715, then API gateway device 170 may send a request to authentication device 350 to validate the access token (M704). Upon receiving request M704, authentication device 350 may validate the access token (Block 725). If the access token is valid, authentication device 350 may send a confirmation message indicating the access token is valid to API Gateway device 170 (M706). API gateway device 170 may then determine that the destination in STRM call M702 is STRM 340 (Block 735). API gateway device 170 may then forward the STRM call and validated access token, along with timestamp T3 determined in Block 715, to STRM 340 (M708). STRM 340 will record timestamp T3, and provide a STRM acknowledgement (ACK) back to API gateway device 170 (M710). API gateway device 170 may then generate another timestamp T4 corresponding to STRM ACK M740 (Block 745). API gateway device 170 may then send the STRM ACK, along with timestamp T3 and timestamp T4, back to content provider device 160 (M712).

Alternatively, if the authentication header is determined to be valid by API gateway device 170 in Block 715, but the access token is determined to be invalid by authentication device 350 in Block 725, then authentication device 350 will provide an error message to API gateway device 170 (M714). API gateway device 170 will forward the error message to content provider device 160 (M716).

In another case, if the authentication header is determined to be invalid by API gateway device 170 in block 715 (or the authentication header was not found in STRM call M702), then API gateway device 170 will provide an error message to content provider 160 (M718).

Figure 8:
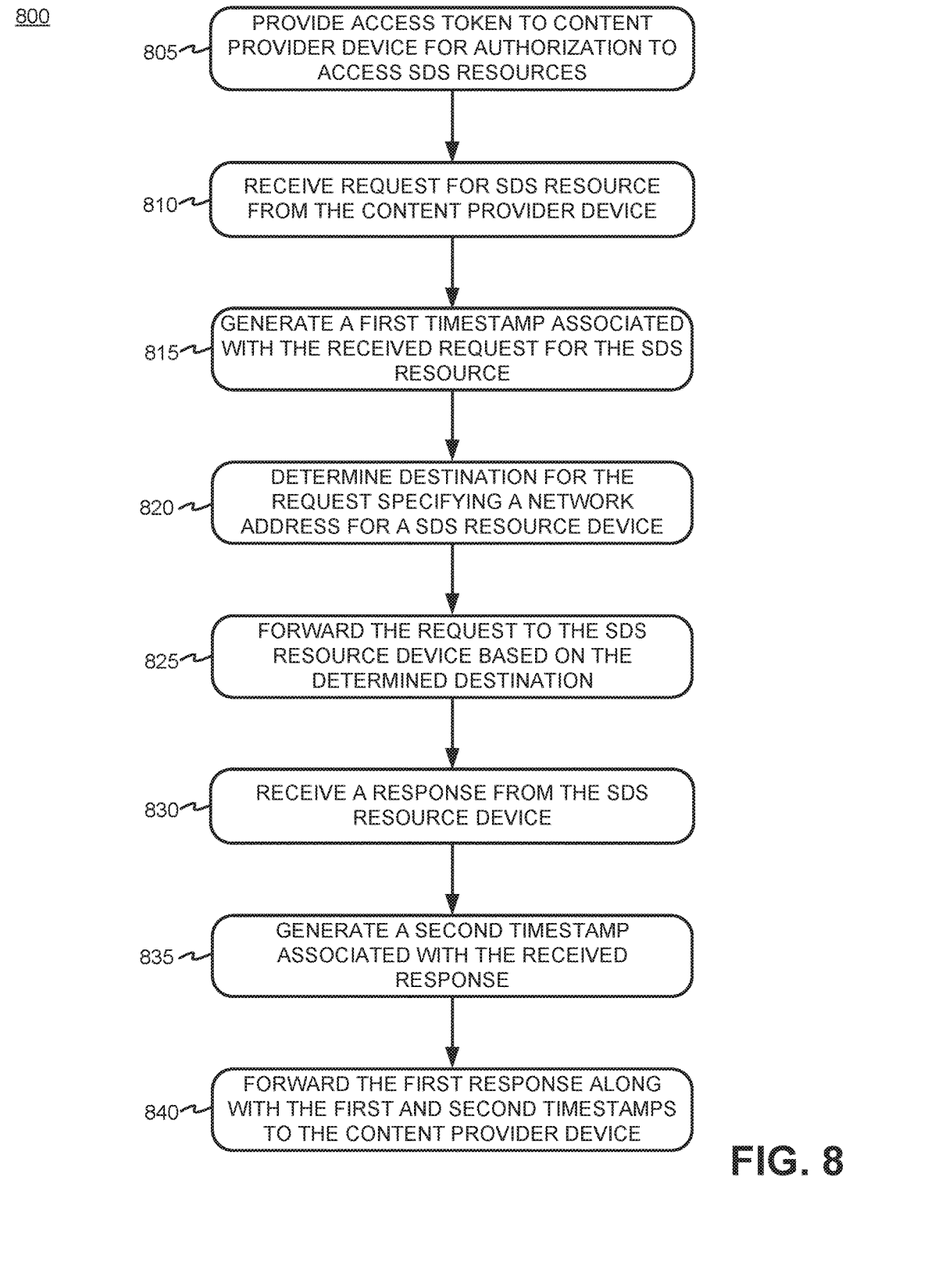
FIG. 8 is a flow chart showing an exemplary process for facilitating secure access to a sponsored data service (SDS) through an application programming interface (API) gateway device.

FIG. 8 is a flow chart showing an exemplary process for facilitating secure access to an SDS through API gateway device 170. In an embodiment, process 800 may be performed at API gateway device 170, by processor 420 executing instructions stored in memory 430, mass storage device 440, and/or downloaded through communication interface 470.

Initially, API gateway device 170 may provide an access token to content provider device 160, where the access token authorizes content provider device 160 to access resources to facilitate sponsored data services (SDS) (Block 805). API gateway device 170 may receive a request for an SDS resource from content provider device 160 (Block 810). API gateway device 170 may then generate a first timestamp associated with the request received from content provider 160 for the SDS resource (Block 815). API gateway device 170 may determine a destination for the request for the SDS resource, where the destination specifies a network address corresponding to a particular SDS resource device 180 (Block 820). API gateway device 170 may forward the request to the SDS resource device 180 based on the determined destination (Block 825). API gateway device 170 may receive a response from SDS resource device 180 corresponding to the first request (Block 830). API gateway device 170 may generate a second timestamp associated with the received response (Block 835). API gateway device 170 may forward the response, along with the first timestamp and the second timestamp, to content provider device 160. The timestamps allow content provider device 160 to facilitate security, and track sponsored content access and/or data consumption to properly bill sponsors and/or analyze sponsored data provided to the user via user device 105 in a "toll-free" manner.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5-8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
providing, from an application programming interface (API) gateway device, an access token to a content provider device, wherein the access token authorizes the content provider device to access resources for sponsored data services (SDSs);
receiving, at the API gateway device, a first request for an SDS resource from the content provider device;
generating, at the API gateway device, a first timestamp associated with the first request;
determining, at the API gateway device, a destination for the first request, wherein the destination specifies a network address corresponding to an SDS resource device;
forwarding, from the API gateway device, the first request to the SDS resource device based on the determined destination;
receiving, at the API gateway device, a first response from the SDS resource device corresponding to the first request;
generating, at the API gateway device, a second timestamp associated with the first response; and
forwarding, from the API gateway device, the first response, along with the first timestamp and the second timestamp, to the content provider device.

2. The method of claim 1, wherein providing the access token to the content provider device, further comprises:
- receiving, at the API gateway device, an authentication request from the content provider device, wherein the authentication request includes credentials of the content provider device;
- generating, at the API gateway device, a third timestamp associated with the authentication request;
- determining, at the API gateway device, that an authentication device is a destination for the authentication request;
- forwarding, from the API gateway device, the authentication request and the credentials of the content provider device to the authentication device;
- receiving, at the API gateway device, the access token, wherein the access token is based on the credentials of the content provider device;
- generating, at the API gateway device, a fourth timestamp associated with the authentication request; and
- forwarding, from the API gateway device, the access token, along with the third timestamp and the fourth timestamp, to the content provider device.

3. The method of claim 2, further comprising:
- caching, at the API gateway device, the access token.

4. The method of claim 2, wherein receiving the authentication request further comprises:
- receiving credentials which include a client identifier and a client secret.

5. The method of claim 1,
- wherein the receiving the first request further comprises receiving a session timing record manager (STRM) call from the content provider device, wherein the STRM call includes the access token,
- wherein the generating the first timestamp further comprises generating the first timestamp associated with the STRM call, and the method further comprises:
- determining, at the API gateway device, whether an authentication header associated with the STRM call is valid.

6. The method of claim 5, further comprising:
- sending a request to an authentication device to validate the access token in response to determining that the authentication header is valid.

7. The method of claim 6, wherein in response to the request to the authentication device to validate the access token, the method further comprises:
- receiving a confirmation from the authentication device that the access token is valid;
- wherein the determining the destination for the first request further comprises determining the STRM as the destination;
- wherein the forwarding the first request further comprises forwarding the STRM call along with the first timestamp and the validated access token to the STRM;
- wherein the receiving the first response further comprises receiving an acknowledgement from the STRM corresponding to the STRM call;
- wherein the generating a second timestamp further comprises generating the second timestamp in response to the acknowledgement from the STRM; and
- wherein the forwarding the first response further comprises forwarding the acknowledgment from the STRM, along with the first timestamp and the second timestamp, to the content provider device.

8. The method of claim 6, wherein in response to the request to the authentication device to validate the access token, the method further comprises:
- receiving an error message indicating the access token is invalid; and
- forwarding the error message to the content provider device.

9. The method of claim 5, wherein upon determining that the authentication header is not valid, the method further comprises:
- receiving an error message indicating the authentication header is invalid; and
- forwarding the error message to the content provider device.

10. A device, comprising:
- an interface configured to communicate with a network;
- a memory configured to store instructions; and
- a processor, coupled to the interface and the memory, wherein the stored instructions, when executed by the processor, cause the processor to:
  - provide an access token to a content provider device, wherein the access token authorizes the content provider device to access resources for sponsored data services (SDSs),
  - receive a first request for an SDS resource from the content provider device,
  - generate a first timestamp associated with the first request,
  - determine a destination for the first request, wherein the destination specifies a network address corresponding to an SDS resource device,
  - forward the first request to the SDS resource device based on the determined destination,
  - receive a first response from the SDS resource device corresponding to the first request,
  - generate a second timestamp associated with the first response, and
  - forward the first response, along with the first timestamp and the second timestamp, to the content provider device.

11. The device of claim 10, wherein the instructions to provide the access token to the content provider device comprise instructions further causing the processor to:
- receive an authentication request from the content provider device, wherein the authentication request includes credentials of the content provider device,
- generate a third timestamp associated with the authentication request,
- determine that an authentication device is a destination for the authentication request,
- forward the authentication request and the credentials of the content provider device to the authentication device,
- receive the access token, wherein the access token is based on the credentials of the content provider device,
- generate a fourth timestamp associated with the authentication request, and
- forward the access token, along with the third timestamp and the fourth timestamp, to the content provider device.

12. The device of claim 11, wherein the instructions further cause the processor to:
- cache the access token.

13. The device of claim 11, wherein the instructions to receive the authentication request further cause the processor to:
- receive credentials which include a client identifier and a client secret.

14. The device of claim 10,
wherein the instructions to receive the first request cause the processor to: receive a session timing record manager (STRM) call from the content provider device, wherein the STRM call includes the access token,
wherein the instructions to generate the first timestamp further cause the processor to: generate the first timestamp associated with the STRM call, and
the memory stores instructions further causing the processor to:
determine whether an authentication header associated with the STRM call is valid.

15. The device of claim 14, wherein when determining whether the authentication header is valid, the instructions further cause the processor to:
send a request to an authentication device to validate the access token in response to determining that the authentication header is valid.

16. The device of claim 15, wherein in response to the request to the authentication device to validate the access token, the instructions further cause the processor to:
receive a confirmation from the authentication device that the access token is valid;
wherein the instructions to determine the destination for the first request causes the processor to determine the STRM as the destination;
wherein the instructions to forward the first request causes the processor to forwarding the STRM call along with the first timestamp and the validated access token to the STRM;
wherein the instructions to receive the first response further causes the processor to receive an acknowledgement from the STRM corresponding to the STRM call;
wherein the instructions to generate a second timestamp further causes the processor to generate the second timestamp in response to the acknowledgement from the STRM; and
wherein the instructions to forward the first response further causes the processor to forward the acknowledgment from the STRM, along with the first timestamp and the second timestamp, to the content provider device.

17. The device of claim 15, wherein in response to the request to the authentication device to validate the access token, the instructions further cause the processor to:
receive an error message indicating the access token is invalid, and
forward the error message to the content provider device.

18. The device of claim 14, wherein upon determining that the authentication header is not valid, the instructions further cause the processor to:
receive an error message indicating the authentication header is invalid; and
forward the error message to the content provider device.

19. A non-transitory computer-readable medium comprising instructions, which, when executed by a processor, cause the processor to:
provide an access token to a content provider device, wherein the access token authorizes the content provider device to access resources for sponsored data services (SDSs);
receive a first request for an SDS resource from the content provider device;
generate a first timestamp associated with the first request;
determine a destination for the first request, wherein the destination specifies a network address corresponding to an SDS resource device;
forward the first request to the SDS resource device based on the determined destination;
receive a first response from the SDS resource device corresponding to the first request;
generate a second timestamp associated with the first response; and
forward the first response, along with the first timestamp and the second timestamp, to the content provider device.

20. The non-transitory computer-readable medium of claim 19, wherein the instructions to provide the access token to the content provider device comprise instructions further causing the processor to:
receive an authentication request from the content provider device, wherein the authentication request includes credentials of the content provider device;
generate a third timestamp associated with the authentication request;
determine that an authentication device is a destination for the authentication request;
forward the authentication request and the credentials of the content provider device to the authentication device;
receive the access token, wherein the access token is based on the credentials of the content provider device;
generate a fourth timestamp associated with the authentication request; and
forward the access token, along with the third timestamp and the fourth timestamp, to the content provider device.

* * * * *